United States Patent

Viano

[15] 3,695,099
[45] Oct. 3, 1972

[54] ROTARY DISK ENGINE TESTING ASSEMBLY

[72] Inventor: Luigi Viano, via Corrado Corradini 20, Moncalieri, Italy

[22] Filed: Nov. 3, 1971

[21] Appl. No.: 195,312

[52] U.S. Cl. ................................................. 73/117.3
[51] Int. Cl. ............................................ G01m 15/00
[58] Field of Search .................. 73/116, 134, 117.3

[56] References Cited

UNITED STATES PATENTS

| 3,527,087 | 9/1970 | Converse et al. | 73/117.3 |
| 3,538,759 | 11/1970 | Schrom | 73/116 |

*Primary Examiner*—Jerry W. Myracle
*Attorney*—Paul & Paul

[57] ABSTRACT

A rotary disk engine testing assembly comprising a rotatable platform adapted to receive a plurality of internal-combustion engines to be tested or run in, the rotatable platform being rotatably supported on a base support and driven in rotation by drive means. Each engine testing unit on the rotatable platform is provided with a friction brake for applying a load to the engine to be tested, means for clamping the engine, a starter motor and carburetor for such engine, means for connection of the carburetor to a fuel supply line on the rotatable platform, and exhaust gas discharge means.

6 Claims, 4 Drawing Figures

ROTARY DISK ENGINE TESTING ASSEMBLY

This invention relates to a rotary disk engine testing assembly which works automatically and is particularly designed for testing or running in internal-combustion engines.

Two- and four-stroke internal-combustion engines have hitherto been tested and run in on benches provided with a brake for exerting a load on the engine to be tested. Such benches require much space and various and repeated testing operations, rendering such operations time-consuming and expensive.

It is therefore an object of the present invention to eliminate this drawback by providing a rotary disk engine testing assembly which requires much less space than the conventional testing assemblies and reduces the operations to be carried out by the operator for testing an engine to a strict minimum.

In fact with the rotary disk engine testing assembly of the present invention the operator only has to carry out the following operations:

mounting the engine to be tested on a rotatable platform of the assembly;

connecting the engine to a carburetor of the assembly;

starting the engine;

adjusting the load to which the engine is to be subjected, by means of a magnetic induction brake, and dismounting the engine from the rotatable platform, if no automatic dismounting device is provided.

The rotary disk engine mounting assembly according to the invention substantially comprises a rotatable platform mounted on a rotary support block mounted on antifriction bearings on a base support which, in addition to the antifriction bearings, also carries drive means for rotation of the rotatable platform, for example, a motor with variator and reduction gear connected through a pinion to the rotary support block;

a plurality of engine testing units or stands on the rotatable platform, each adapted to receive an engine to be tested, the number of such units accommodated on the rotatable platform being determined by the size of the latter and the size of the engines to be tested, the mounting on and/or dismounting of the engines from the testing stands being effected manually or automatically;

a revolution indicator, for example, an electronic revolution indicator, arranged to the vicinity of the mounting and dismounting station, connected to the engine testing units and adapted to record the number of revolutions of the engines at the beginning and at the end of the testing cycle;

a starter motor, a magnetic induction brake and at least one carburetor in each of the engine testing units or stands;

a fan in each of the engine testing stands for conveying the exhaust gases from the engines being tested to a collecting column arranged in the center of the rotatable platform;

a fuel tank in the form of an annular duct of circular cross section extending peripherally around and above the rotatable platform;

a tubular duct connected to the fuel tank for recycling the fuel by means of an appropriate pump;

means for clamping the engine to be tested in each testing stand;

at least two perpendicularly arranged air cylinders in each testing stand for moving the clamping means in two perpendicular directions toward and away from the engine to be tested;

an air pump connected through at least one air filter to an air collector and the air cylinders to feed compressed air to the latter;

cabinets arranged on the interior upper surface of the rotatable platform for accommodating the electrical connection and remote control apparatus, for example, push-button switches, and mechanical and electrical safety devices for controlling and ensuring the operation of the rotatable platform and of the engines being tested.

A preferred embodiment of the invention will now be described by way of example and with reference to the accompanying drawings, in which.

Figure 1:
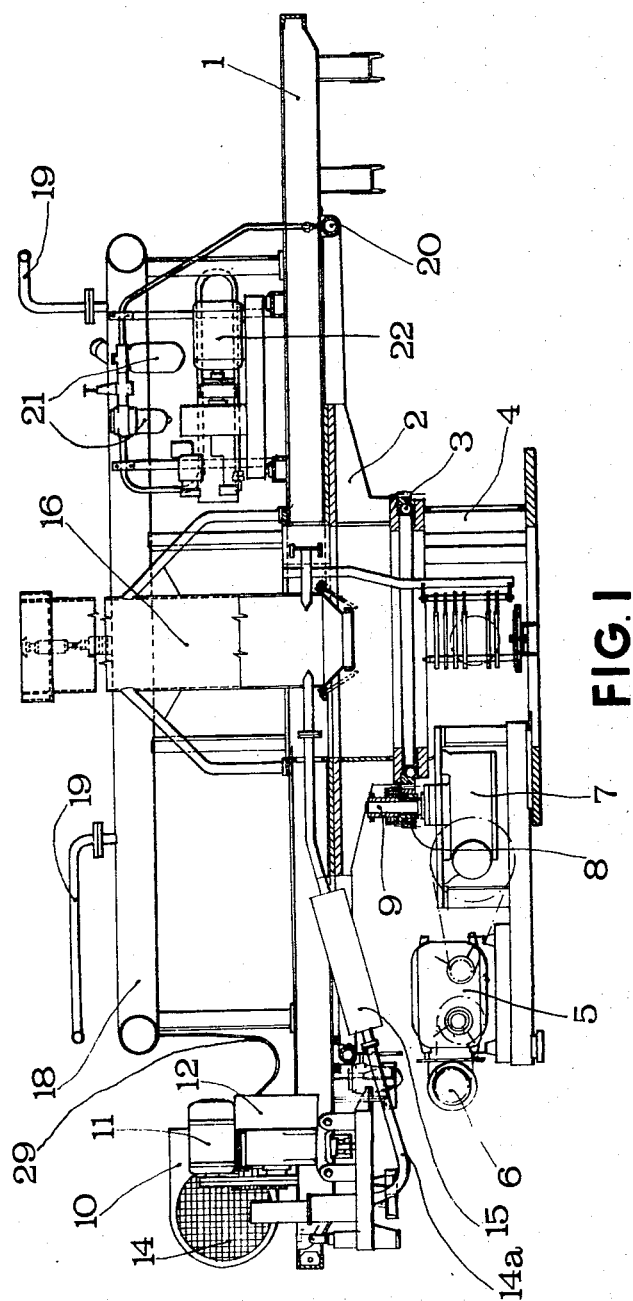
FIG. 1 is a diametral section through a rotary disk assembly according to the present invention.

Referring to FIG. 1, there is shown a rotary disk assembly for testing and running in internal-combustion engines, which substantially comprises a rotatable platform 1 mounted on a rotary support block 2 rotatably mounted on antifriction bearings 3, and a base support 4 for the support block 3. The antifriction bearings 3 and the drive means for producing the rotary movement of the platform 1 are mounted on the base support 4, such drive means comprising a variator 5 driven by a motor 6 and coupled to a reduction gear 7 in turn coupled through a pinion 8 to the rotary support block 2. The pinion 8 serving to transmit rotary motion to the support block 2 carries a safety joint 9.

The rotatable platform 1 is provided with a plurality of engine testing units or stands 10 on which the engines to be tested are mounted, the number of such stands being determined by the size of the engines to be tested and the size of the rotatable platform 1. The engines to be tested are mounted on and dismounted from the stands 10 either manually or automatically.

In the embodiment shown in the drawings, the rotatable platform 1 is designed to receive two-stroke engines which are mounted manually thereon but dismounted automatically.

Figure 3:
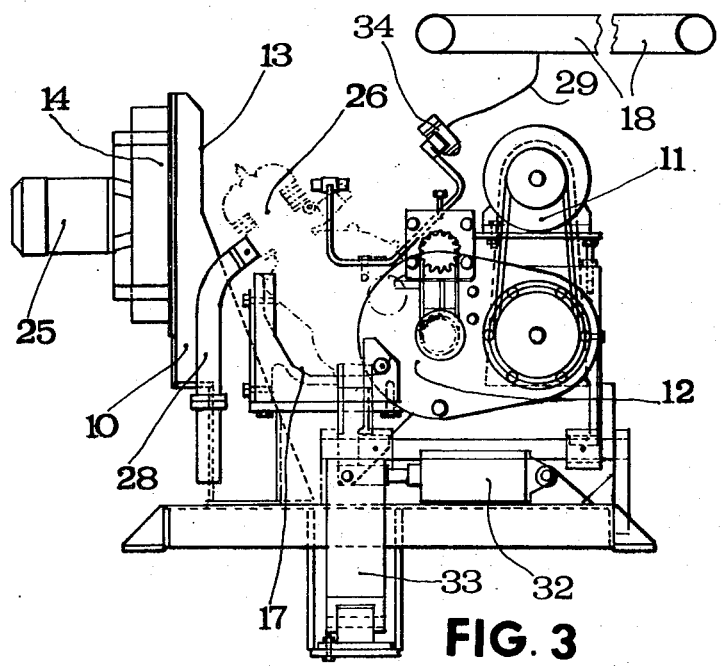
FIG. 3 is a detail view showing on a larger scale an engine testing unit mounted on the rotary disk assembly.
Figure 4:
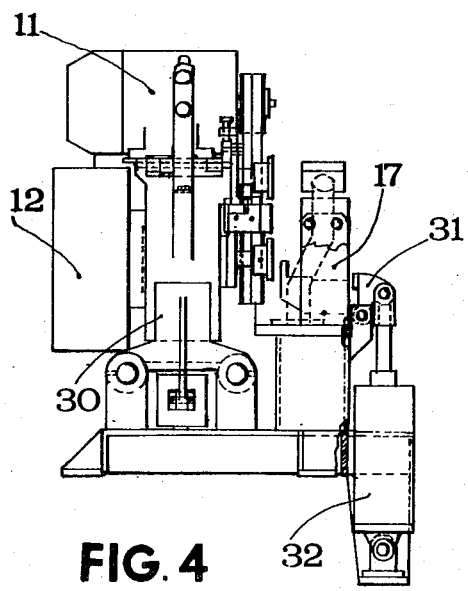
FIG. 4 is a side view of the testing unit of FIG. 3.

Each engine testing unit 10 has a seat 17 for mounting an engine 26 to be tested thereon and clamps 30 and 31 movable by pneumatic cylinders 32 and 33, respectively, in perpendicular directions to clamp the engine 26 therebetween, as shown in FIGS. 3 and 4.

Each engine testing unit 10 further comprises a starter motor 11 for the engine 26 to be tested, a magnetic induction brake 12 providing the load to which the engine is subjected, and a fan 13 for feeding the exhaust gases of the engines being tested through a grid 14 and a pipe 14a provided with a muffler 15 into a collecting column 16 arranged in the center of the rotatable platform 1 (FIG. 1).

Figure 2:
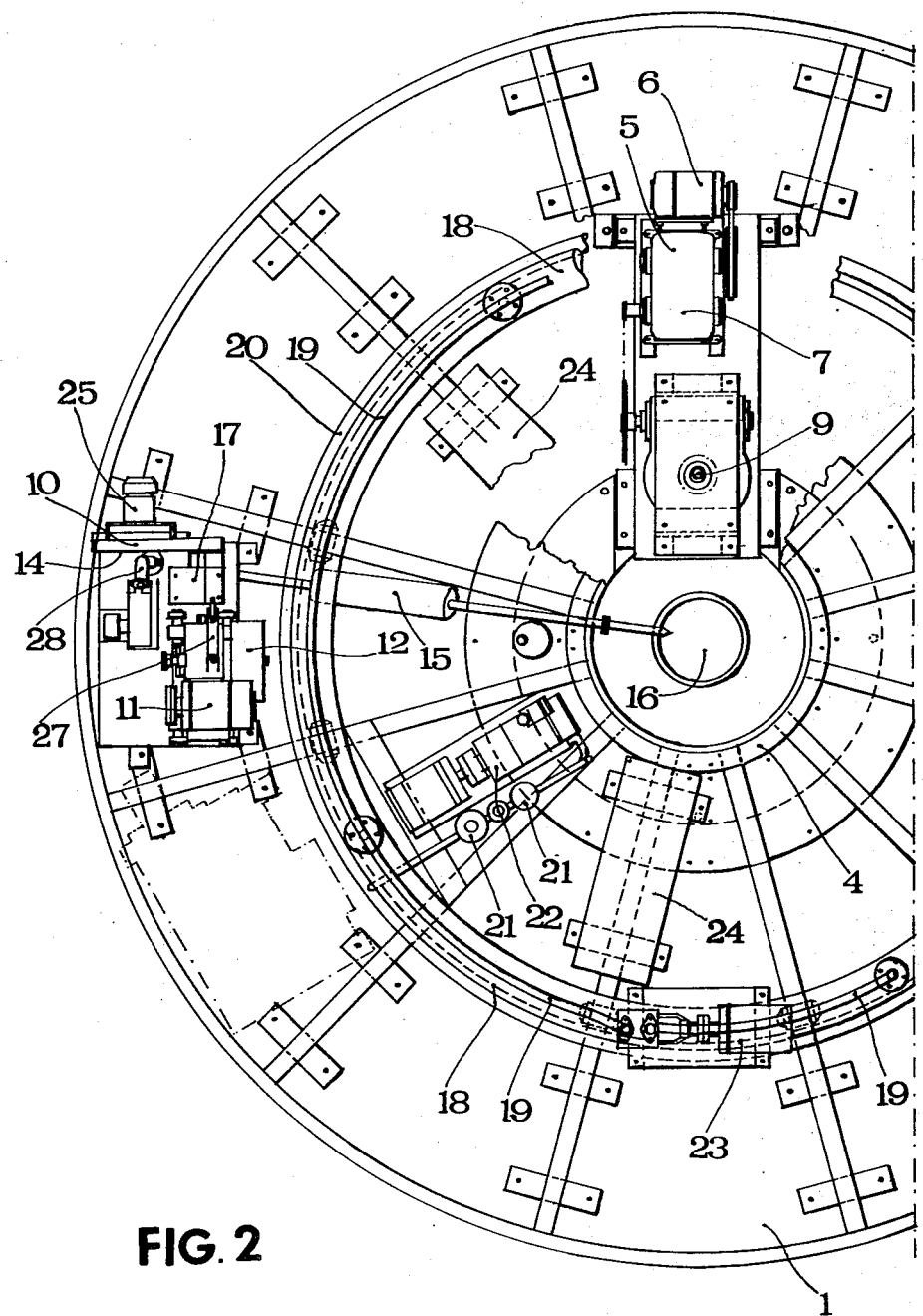
FIG. 2 is a part top plan view of the rotary disk assembly of FIG. 1.

Each testing stand 10 is further provided with at least one carburetor 34 (FIG. 3) mounted on a support 27 and connected by a flexible pipe 29 to a fuel supply tank which in the illustrated embodiment is formed by an annular duct 18 of circular cross section extending peripherally around and above the rotatable platform 1. A fuel recycling duct 19 is arranged above the duct 18 and connected thereto and to a recycling pump 23 (FIG. 2).

As shown in FIG. 1, an air pump 22 is arranged on the rotatable platform 1 and connected through a pair of air filters 21 to an air collector 20. The air collector 20 supplies compressed air to the pneumatic cylinders 32 and 33 through conduit means (not shown). An electronic revolution indicator is provided adjacent the loading and unloading station and connected to the engine testing units 10 and records the number of revolutions of the engines at the beginning and at the end of each testing or running-in cycle.

The electrical connection and control apparatus is accommodated in cabinets 24 arranged on the interior of the rotatable platform 1 and push-button controls are provided on each engine testing stand 10. Mechanical and electrical safety devices are provided to control and ensure safe operation of the rotatable platform and of the engines to be tested.

The components of a testing stand 10 are shown more clearly in FIG. 3. Thus there is seen the fan 13 which is provided with a drive motor 25 and the radiator-like grid 14 and serves to discharge the exhaust gases. The starter motor 11 is shown on the right in FIG. 3 and the magnetic induction brake 12 providing the load for the engine to be tested is arranged therebelow. The engine 26 to be tested is shown in dash-and-dot lines and is mounted on the seat 17. A conduit 28 serves for connection to the discharge circuit 15, 16.

The aforedescribed rotary disk testing assembly is provided for continuous rotation and its speed of rotation depends on the running-in time. The variator 5 is remote controlled by the operator and serves to adapt the speed of rotation to the requirements of each individual case.

Although a preferred embodiment of the invention has been described herein it is to be understood that the invention is not limited to this precise embodiment and that various changes and modifications may be made therein without departing from the scope of the invention.

I claim:
1. A rotary disk engine testing assembly comprising
a rotatable platform mounted on a rotary support block mounted on antifriction bearings;
a base support carrying said antifriction bearings and drive means for rotation of said rotatable platform;
a plurality of engine testing units spaced around the periphery of said peripheral platform;
each of said engine testing units including a seat for an engine to be tested, at least one carburetor and a starter motor for starting said engine, a magnetic induction brake for subjecting said engine to a load, and a fan for conveying the exhaust gases from said engine through conduit means to a collecting column arranged in the center of said rotatable platform;
a revolution indicator for indicating and recording the number of revolutions of the engines to be tested at the beginning and at the end of testing;
a fuel tank in the form of an annular duct extending peripherally around and above said rotatable platform;
a fuel recycling duct above said annular duct and connected thereto and to a fuel recycling pump;
means for clamping the engine to be tested in each testing stand;
at least two perpendicularly arranged air cylinders in each testing stand for moving the clamping means in two perpendicular directions toward and away from the engine to be tested, and
an air pump connected through at least one air filter to an air collector and the air cylinders to feed compresses air to the latter.

2. A rotary disk engine testing assembly as claimed in claim 1, wherein said drive means for rotation of the rotatable platform comprises a motor with variator and reduction gear connected through a pinion to the rotary support block.

3. A rotary disk engine testing assembly as claimed in claim 2, wherein said variator is arranged for remote control by the operator to adapt the speed of rotation of the rotatable disk to the time required for testing the engines.

4. A rotary disk engine testing assembly as claimed in claim 1, further comprising cabinets arranged on the interior of the rotatable platform for accommodating electrical connection and remote control apparatus for controlling rotation of the rotatable platform.

5. A rotary disk engine testing assembly as claimed in claim 1, wherein push-button control switches are arranged in each testing stand, to control the operation of the engine to be tested.

6. A rotary disk engine testing assembly as claimed in claim 1, further comprising mechanical and electrical safety devices to ensure safe operation of said rotatable platform.

* * * * *

UNITED STATES PATENT OFFICE
CERTIFICATE OF CORRECTION

Patent No. 3,695,099  Dated October 3, 1972

Inventor(s) Luigi Viano

It is certified that error appears in the above-identified patent and that said Letters Patent are hereby corrected as shown below:

On the cover sheet, insert -- [33] Priority Claimed Italy    69,639-A/71    August 4, 1971 -- .

Signed and sealed this 8th day of May 1973.

(SEAL)
Attest:

EDWARD M. FLETCHER, JR.  ROBERT GOTTSCHALK
Attesting Officer  Commissioner of Patents